US006658027B1

(12) United States Patent
Kramer et al.

(10) Patent No.: US 6,658,027 B1
(45) Date of Patent: Dec. 2, 2003

(54) JITTER BUFFER MANAGEMENT

(75) Inventors: Kris W. Kramer, Kanata (CA); Chris C. Forrester, Ottawa (CA); Robert Joly, Nepean (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/374,528

(22) Filed: Aug. 16, 1999

(51) Int. Cl.[7] .................................................. H04J 3/06
(52) U.S. Cl. ....................................... 370/516; 370/517
(58) Field of Search ................................. 370/229, 232, 370/235, 242, 252, 253, 516, 517, 519

(56) References Cited

U.S. PATENT DOCUMENTS

| | | | | | |
|---|---|---|---|---|---|
| 6,389,032 B1 | * | 5/2002 | Cohen | ........................ | 370/412 |
| 6,434,606 B1 | * | 8/2002 | Borella et al. | ............... | 709/214 |
| 6,452,950 B1 | * | 9/2002 | Ohlsson et al. | ............. | 370/516 |

* cited by examiner

Primary Examiner—Wellington Chin
Assistant Examiner—Brenda Pham
(74) Attorney, Agent, or Firm—Steubing McGuinness & Manaras LLP

(57) ABSTRACT

In order to compensate for rate mismatches between near end (receiving) and far end (transmitting) devices, intelligent jitter buffer management is implemented by apparatus comprising: a data interface for receiving frames from a data network; a jitter buffer for temporarily storing said frames; a detector for detecting frames which satisfy a criteria; and a buffer manager for controlling the frames stored in said jitter buffer based on the condition of said buffer and on frames which satisfy said criteria. The criteria can include silence frames or frames received with errors. The condition can include a high water mark (high threshold), and a low water mark (low threshold). If the far end transmitter transmits at a faster rate than the near end receiver, the jitter buffer will eventually become full beyond the high water mark, in which case frame(s) which satisfy the criteria will be deleted. If the far end transmitter transmits at a slower rate than the near end receiver, the jitter buffer will eventually become depleted below the low water mark, in which case silence frame(s) will be inserted after received silence frames.

20 Claims, 6 Drawing Sheets

JITTER BUFFER MANAGEMENT

FIELD OF THE INVENTION

The present invention relates to data transmission of streaming data. The invention is particularly suited for voice over packet data networks, for example Voice over Internet Protocol (VoIP) networks.

BACKGROUND TO THE INVENTION

For VoIP networks, audio signals are digitized into frames and transmitted as packets over an IP network. The transmitter sends these packets at a constant transmission rate. An appropriately configured receiver will receive the packets, extract the frames of digital data and convert the digital data into analog output using a digital to analog (D/A) converter. One of the characteristics of an IP network is that packets will not necessarily arrive at their destination at a constant rate, due to variable delays through the network. However, digital audio data (for example a digitized voice conversation) must be played out at a constant output rate in order to reconstruct the audio signal, and the D/A converter operates at such a constant output rate.

A known solution for this problem is to implement a jitter buffer in the receiver. A jitter buffer stores frames as they are received from the network. After several frames are loaded into the buffer, the frames in the buffer are output at the constant output rate. As long as the average rate of reception of the packets is equal to the constant output rate, the jitter buffer allows the packets to be output at the constant output rate even though they are not necessarily received at a constant rate.

In traditional (e.g., PSTN) digital telephony systems, end points are synchronized by a common master clock in order to ensure that the D/A and A/D converters at both ends operate at the same data rate. In other words, the PSTN is a synchronous network, and thus the constant transmission rate is the same as the constant output rate. However in a packet based system, there is no common clock to ensure synchronization of the data rates. Thus the two endpoints will typically have marginally different data rates. Thus the constant output rate from the jitter buffer will differ from the far-end constant transmission rate.

For example, let us assume that the clock rate of the A/D converter of the far-end transmitter is slightly faster than the clock rate of the D/A converter of the receiver. This will result in the far end transmitter sending digital samples of audio data at a rate faster then the local receiver will be converting the digital samples into analog. This will result in a output rate of the jitter buffer which is slower than the far-end transmission rate. Eventually this will result in the jitter buffer becoming full. In traditional jitter buffer designs, this will result in a random discard of a frame, which degrades audio quality.

Thus, while known jitter buffer techniques can compensate for variable transmission delays through the network (provided the average rate of reception is equal to the constant output rate), the jitter buffer can be either depleted or filled to capacity due to a rate mismatch between the far-end transmitter and the local receiver.

There exists a need to overcome this problem.

SUMMARY OF THE INVENTION

An object of the present invention is to provide a system which monitors the jitter buffer in order to determine conditions when a frame will need to be deleted or inserted. When such a condition exists, the system intelligently selects frames for insertion or deletion based on a criteria which reduces the impact of such an insertion/deletion. Thus, the system includes a detector for detecting frames which satisfy a criteria indicative of the impact of the insertion or deletion of a frame.

For example, for a voice conversation, there are silence frames which result from inherent gaps in speech. A silence frame is better to delete than a frame with actual speech content. Furthermore, if a frame needs to be inserted, it is better to insert a silence frame immediately after a silence frame than between two content frames. Thus in one embodiment, the criteria includes the detection of silence, and the detector includes a silence detector (for example a Voice Activity Detector (VAD) or envelope detector) to detect silent frames. Such a system extends silence intervals, by detecting silence and inserting silence frame(s) at head of jitter buffer, when the jitter buffer is depleted below a depletion threshold (called the low water mark). Similarly when the jitter buffer is filled beyond a filled threshold (called the high water mark), the system deletes silence frames. Note that in this specification silence (or a silent frame) can include background and/or comfort noise.

Another example of criteria indicative of the impact of the insertion or deletion of a frame includes whether a frame is received with errors. Another criteria includes information associated with received frames about the mode of operation of the apparatus when the apparatus is using some kind of echo control or switched loss algorithm (for example, during handsfree operation). For example an indication that a frame is received while a terminal is transmitting (i.e. near end talking) or in quiescent mode would indicate that such a frame can be deleted with minimal audible impact.

In accordance with a broad aspect of the present invention there is provided a method of managing a jitter buffer comprising the steps of:

receiving frames from a data network;

storing received frames into said jitter buffer;

detecting frames which satisfy a criteria; and controlling the frames stored in said jitter buffer based on the condition of said buffer and on frames which satisfy said criteria.

According to a further aspect of the invention, said condition comprises a high water mark and a low water mark and wherein said controlling step comprises:

deleting a frame from said jitter buffer when the high water mark is exceeded and when said criteria is satisfied; and inserting a frame into said jitter buffer when said buffer is depleted below said low water mark and when said criteria is satisfied.

In accordance with another broad aspect of the present invention there is provided Apparatus comprising:

a data interface for receiving frames from a data network a jitter buffer for temporarily storing said frames;

a detector for detecting frames which satisfy a criteria; and a buffer manager for controlling the frames stored in said jitter buffer based on the condition of said buffer and on frames which satisfy said criteria.

BRIEF DESCRIPTION OF THE DRAWINGS

The present invention, together with further objects and advantages thereof will be further understood from the following description of the preferred embodiments with reference to the drawings in which.

DETAILED DESCRIPTION OF THE PREFERRED EMBODIMENT

We will describe the preferred embodiments of the invention with reference to the example of a Voice over IP (VoIP) apparatus. However the invention is not limited to IP, and can be used with other packet data networks. Furthermore, for convenience, we will discuss the examples of a VoIP apparatus which forms part of, or connects to a single voice terminal. However, it should be noted that the invention can be implemented in a network device, for example a PSTN-IP gateway, or PBX or Key system.

Figure 1:
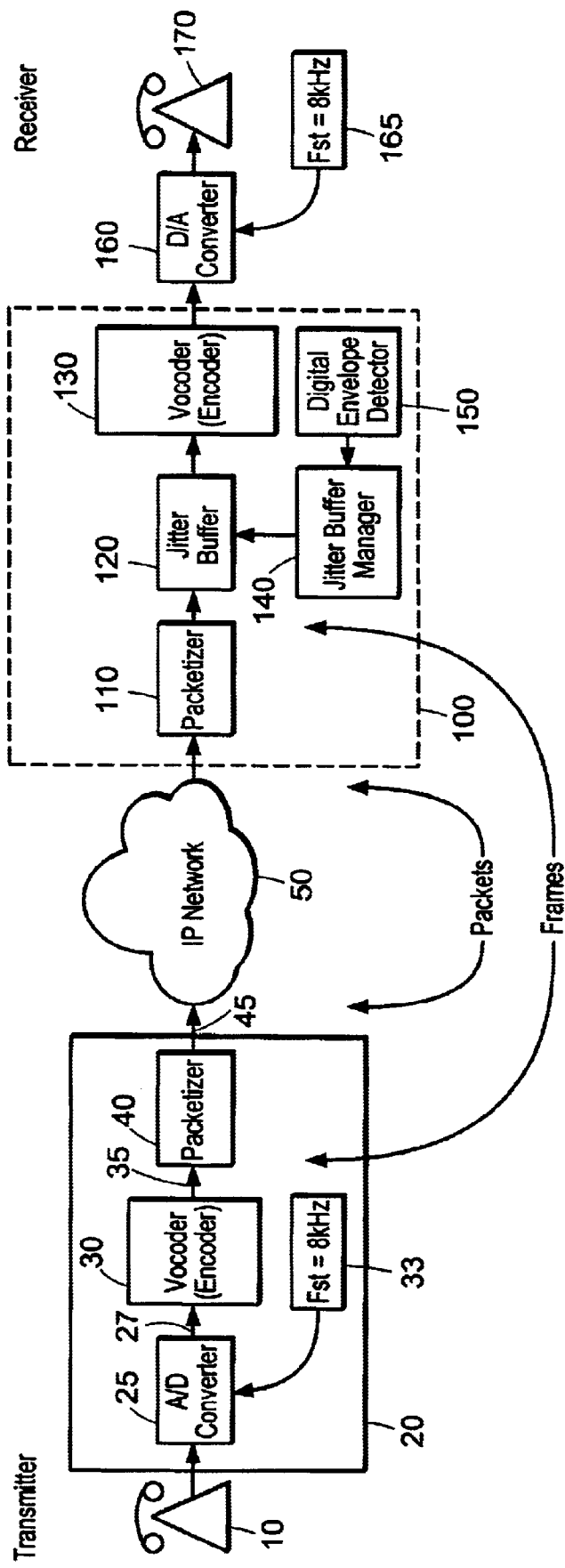
FIG. 1 illustrates a VoIP apparatus connected to an IP network according to an embodiment of the invention.

FIG. 1 illustrates a voice over IP apparatus connected to an IP network according to an embodiment of the invention. In FIG. 1, an IP network 50 provides transmission of voice packets from a far-end transmitter 20 to a local receiver 100. In this particular example, the far-end transmitter includes a handset 10 and a voice over IP (VoIP) transmitter 20. In this example, the voice over IP transmitter 20 includes an analog to digital (A/D) converter 25, for example, a CODEC. The A/D converter 25 digitizes audio from the handset 10 at a constant transmission rate which depends on a transmit clock frequency provided by a local crystal 33. The output from the A/D converter 25, for example, a PCM (Pulse Code Modulated) signal 27 is sent to a frame-oriented vocoder which produces frames of digital/audio data according to a particular vocoding algorithm in use. These frames 35 are sent to an IP packetizer interface 40 which structures the frames into IP packets 45 according to known Internet protocols and then sends these packets to the IP network 50 for transmission to the receiver. The packets 45 are sent at a constant transmission rate that is dictated by the A/D converter 25 and its input clock frequency from the crystal 33.

The IP network adds a variable delay such that the receiver does not necessarily receive the packets at the same rate as they were transmitted. The receiver VoIP apparatus 100 comprises an IP depacketizer interface 110 which receives the IP packets from the IP network 50 and includes a depacketizer for deconstructing the packets into their component frames. These frames are then stored temporarily in a jitter buffer 120 which is controlled by a jitter buffer manager 140. The frames are then sent to a vocoder 130 which deconstructs the frames according to a particular vocoder routine. The vocoder 130 produces, for example, PCM output, which is sent to the D/A converter 160 (e.g., a CODEC) which converts the digital signal into an analog audio signal which is sent to the handset 170. The constant output rate of the receiver 100 is dictated by the clock frequency of clock 165 which controls the "sampling" or "playback" rate of the CODEC.

As stated previously in the background section, conventional jitter buffers can typically compensate (or at least alleviate) random delays of packet transmission through the IP network 50. However, conventional jitter buffers fail to compensate for a rate mismatch between the clock of crystal 33 in the far-end transmitter and the clock frequency of the crystal 165 in the local receiver. This rate mismatch results in a constant transmission rate that differs from the constant output rate. This will tend to either deplete or fill the jitter buffer. This typically results in the random insertion of a silence frame or the random discard of a frame. Either way, the audio quality is degraded.

One aspect of the invention reduces such audio degradation by including a detector for detecting frames which satisfy criteria so as to intelligently insert or discard frames as needed. Thus, the jitter buffer manager controls the frames stored in the jitter buffer, based on the condition of the jitter buffer, and if necessary, based on frames which satisfy said criteria. In the embodiment shown in FIG. 1, the criteria includes a frame which represents silence and the detector comprises an envelope detector (or a voice activity detector) coupled to the output of the vocoder 130. This detector determines whether the output from the voice coder represents silence (which, for the purposes of the specification, can include comfort noise). If this criteria is detected, a signal is sent to the jitter buffer manager indicating that the frame sent to the vocoder 130 represents a silent frame. The jitter buffer manager will use this information to control the insertion or deletion of frames in the jitter buffer as required, depending on the condition of the jitter buffer, as will be described in more detail below.

Note that the VoIP apparatus can take a variety of forms. In one form, the voice over IP apparatus forms part of an integrated phone, which includes the VoIP apparatus, a screen display, a touch pad and a handset. Alternatively, the VoIP apparatus can include an interface for allowing a digital phone (for example, a phone adapted to work with a digital key system or digital PBX) to communicate via a packet network by coupling to the VoIP apparatus. In this example, the D/A converter will be located in the digital phone, and the VoIP apparatus will include a clock signal which will determine the constant output rate. Furthermore, the phone will derive its sampling rate by phase locking to the output clock signal provided by the VoIP apparatus (as is known in the PBX art). The VoIP apparatus, in fact, can form part of a key system or PBX. Furthermore, the VoIP apparatus can include a subscriber line interface circuit (SLIC) for coupling to a conventional analog phone. Furthermore, note that the transmitter 20 can form part of a PSTN-IP Gateway, as can the VoIP apparatus 100.

Figure 2:
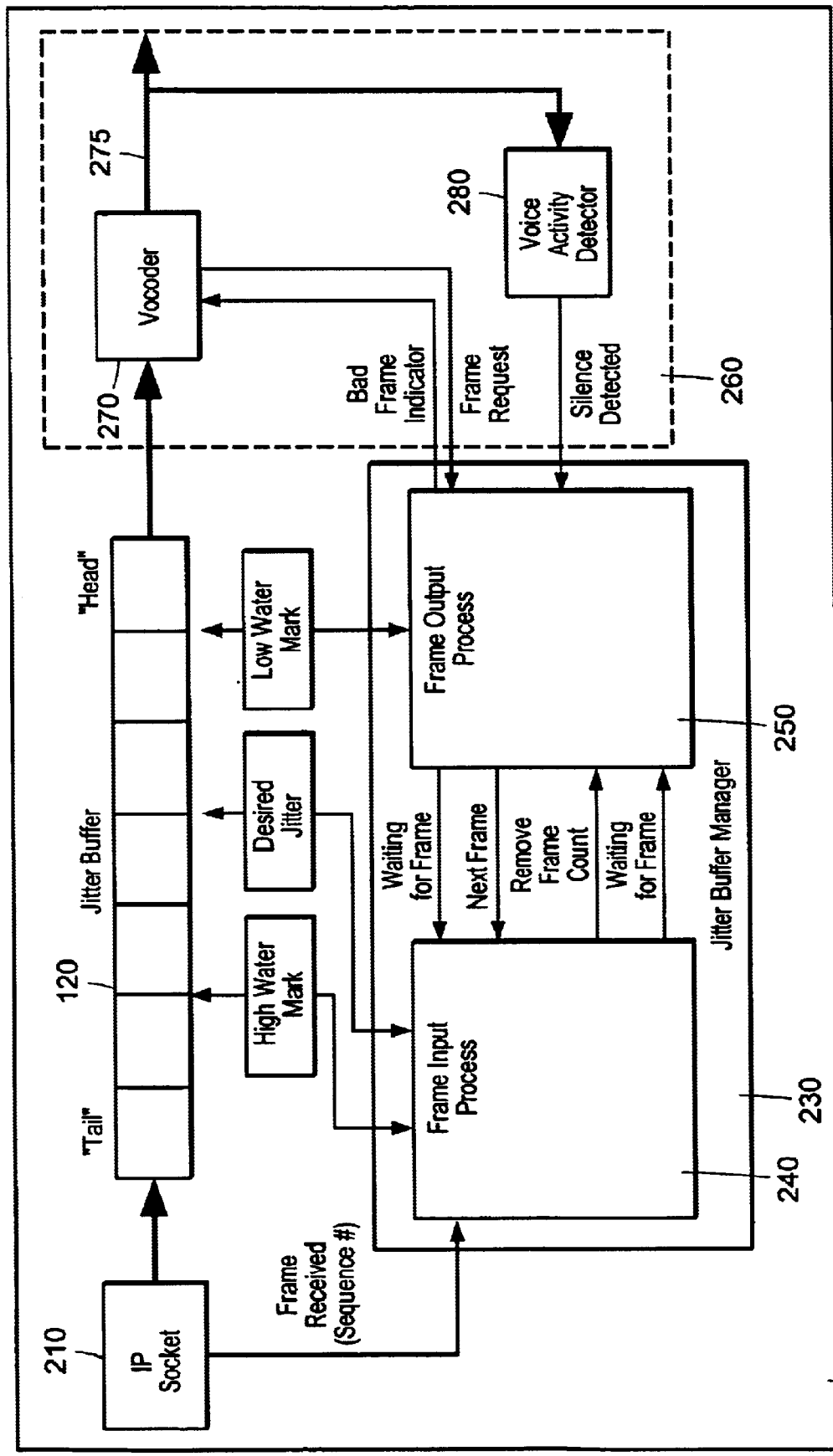
FIG. 2 is a functional block diagram illustrating the VoIP apparatus of FIG. 1.

FIG. 2 is a functional block diagram of the VoIP apparatus 100 of FIG. 1. The apparatus includes functional blocks representing an IP socket 210, a jitter buffer 120, a jitter buffer manager 230 and a DSP 260 including a frame criteria detector. The jitter buffer manager includes a frame input process 240 and a frame output process 250. The jitter buffer manager will typically be implemented as software instructions executed on a controller, for example, a microprocessor or an advanced RISC machine (ARM) and associated memory.

In FIG. 2, an IP socket 210, which is the application programming interface (API) used to gain access to the IP network, delivers the IP packets to the frame input process 240. In the embodiment shown, the DSP 260 includes a vocoder 270 and a voice activity detector 280 coupled to the output of the vocoder 270 which determines whether silence is detected at the output of the vocoder. In this embodiment of the invention, there is associated with the jitter buffer 120, a high water mark, a desired jitter level and a low water mark. Both the high water mark and the low water mark represent buffer conditions used by the jitter buffer manager in determining whether a frame or frames need to be inserted or deleted from the jitter buffer. If the jitter buffer depth drops below the low water mark threshold, this indicates that jitter in arrival rate of the received packets may propagate through the jitter buffer to the vocoder and affect the audio quality of the signal. If the jitter buffer depth expands to the high water mark, this signals that the total delay of the jitter buffer is getting too long and this can also negatively affect the perceived audio quality.

The jitter buffer is a variable length buffer usually on the order of a few tens of milliseconds long. The jitter buffer should be long enough to be able to store a sufficient number of frames such that the jitter buffer manager can accommodate the high water mark threshold, as explained below, while still allowing for some headroom for short packet bursts, over the entire range of expected desired jitter buffer depths. The jitter buffer length is also constrained by cost and performance factors and the desired jitter level. The desired jitter level represents a trade-off between added delay, which is generally undesirable, and the need to compensate for large variations in packet reception rates.

The jitter buffer manager inserts received frames at the tail of the jitter buffer and moves the frames to the head of the buffer while maintaining proper ordering. Frames propagate to the head of the jitter buffer where they are sent to the vocoder at the constant output rate. However, a frame at the head of the jitter buffer may be deleted by the jitter buffer manager, or a frame at the head of the jitter buffer may be delayed as an additional frame is inserted ahead of it.

The frame input process 240 and the frame output process 250 will be described in more detail below with reference to FIGS. 4 and 5 respectively. In brief, the frame input process receives frames from the IP socket 210 (along with the sequence number) and places the frames into the jitter buffer. Normally, the frame will be inserted in the next available slot in the buffer, however this depends on the sequence number of the received frame and the sequence number of frames in the jitter buffer. In an IP network, frames may be received out of order, in which case the frame input process will insert the frame into the appropriate slot in the jitter buffer in order to maintain its proper time alignment based on its sequence number. If the frame sequence number indicates that the frame is too late (because a frame with a later sequence number has already been sent to the vocoder) then the frame is discarded. The frame input process also detects if the jitter buffer depth has reached the high water mark, and if so, initiates a frame removal process. The frame removal process deletes one frame at a time until the desired jitter level is reached, as the high water mark represents a buffer condition indicating that the total delay added by the jitter buffer is getting too long and increasing delay beyond this point will lead to a degradation in quality of service. One advantage of the present invention is that the frame removal process does not randomly delete frames but rather looks for frames that satisfy a particular criteria, as indicated by a detector (in this example, the voice activity detector). This will be discussed in more detail below. The frame input process also triggers the frame output process when a new frame is received after the frame output process failed to service the last frame request issued by the vocoder (i.e. jitter buffer was empty at time of last request).

The frame input process uses the following inputs and outputs:

| Inputs: | Type | Source |
|---|---|---|
| Voice Frame from IP Socket for Input to Jitter Buffer | Data | (IP Stack) |
| Frame Received (Sequence #) | Signal | (IP Stack) |
| "HighWaterMark" | Variable | (Predetermined) |
| "DesiredJitter" | Variable | (Predetermined) |
| "WaitingForFrame" | Boolean Variable | (Frame Output Process) |
| "NextFrame" | Variable | (Frame Output Process) |
| Outputs: | Type | Destination |
| "RemoveFrameCount" | Variable | (Frame Output Process) |
| "FrameAvailable" | Signal | (Frame Output Process) |

The frame output process supplies frames to the vocoder (from the head of the jitter buffer) based on periodic requests by the vocoder. These periodic requests occur at the constant output rate determined by a local clock source. The frame output process also removes frames from the jitter buffer according to the frame removal process. The frame output process also detects a jitter buffer underflow and informs the input process accordingly. The frame output process also preferably detects if the jitter buffer depth has reached the low water mark and if so, initiates a silence frame insertion process by inserting frames at the head of the jitter buffer when the low water mark condition is true and when the voice activity detector indicates a silence frame has just been processed by the vocoder.

The frame output process uses the following inputs and outputs:

| Inputs: | Type | Source |
|---|---|---|
| "RequestForFrame" | Signal | (Vocoder) |
| "SilenceDetected" | Signal | (VAD) |
| "RemoveFrameCount" | Variable | (Frame Input Process) |
| "FrameAvailable" | Signal | (Frame Input Process) |
| "LowWaterMark" | Variable | (Predetermined) |
| Outputs: | Type | Destination |
| "NextFrame" | Variable | (Frame Input Process) |
| "WaitingForFrame" | Boolean Variable | (Frame Input Process) |
| "BadFrameIndicator" | Signal | (Vocoder) |
| Voice Frame from Jitter Buffer to Vocoder | Data | (Vocoder) |

Figure 3:
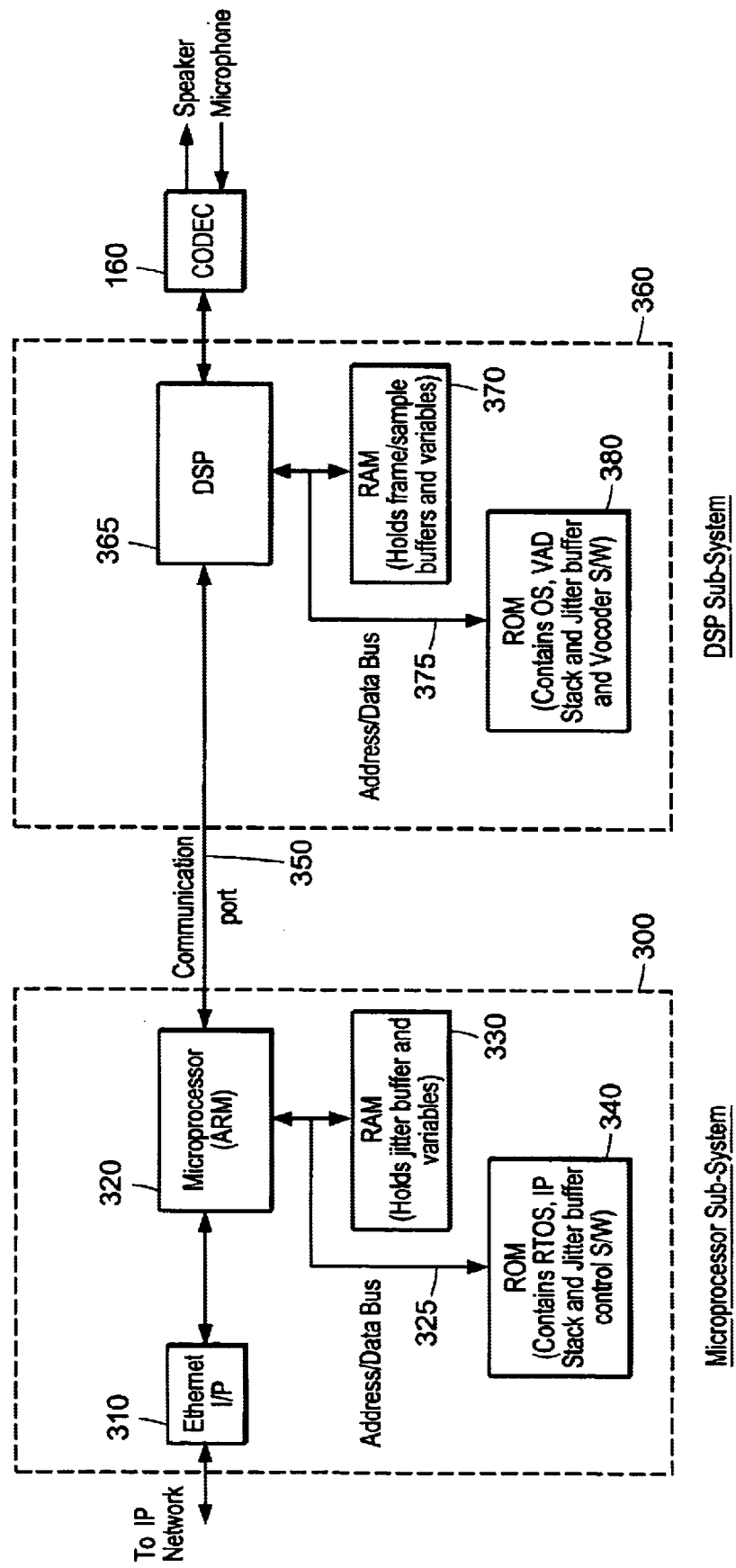
FIG. 3 is a hardware block diagram showing the elements in the VoIP apparatus which implement the functions of FIG. 2.

FIG. 3 is a hardware block diagram illustrating the hardware components of a VoIP apparatus according to an embodiment of the invention for implementing the functional blocks of FIG. 2. According to this embodiment, the hardware includes a microprocessor subsystem 300 and a Digital Signal Processor (DSP) subsystem 360. The microprocessor subsystem and the DSP subsystem are interconnected via communication port 350. The microprocessor subsystem 300 includes a microprocessor 320, for example, an Advanced Risk Machine (ARM) processor 320, RAM 330, an address/data bus 325 and ROM 340, as well as an Ethernet interface 310. Note that the RAM represents working memory for implementing the jitter buffer and storing the values of variables whereas the ROM contains the real-time operating system (RTOS), the IP stack and the jitter buffer control software. Similarly, the DSP subsystem includes a DSP 365, RAM 370 and ROM 380 for containing software instructions for implementing, for example, the OS (the Operating System), the voice activity detector and the vocoder software. The DSP subsystem also includes an address/data bus 375. The microprocessor 320 and the DSP 365 communicate via communication port 350, which allows the transmission of both frames and signalling between the two subsystems. The DSP is also connected to a CODEC 160 for producing analog output to the receiver speaker on the receive side and also for receiving analog input from the microphone of the receiver. Note that this drawing only illustrates the components required to implement the functions of FIG. 2 and other components for implementing a fully-functional device will also be required, as should be apparent to a person skilled in the art. For example, the device can include a screen, keypad, and echo controller (which can include a switch loss system) for switching between receive mode, quiescent mode and transmit mode. Furthermore, the microprocessor subsystem 300 can act as a controller for the entire device or it can be an independent microprocessor subsystem controlled by the device controller.

In this embodiment, the microprocessor subsystem 300 implements the jitter buffer, the IP stack (accessed through the IP socket), the frame input process and the frame output process. The DSP subsystem 360 implements the vocoder and voice activity detector according to this embodiment of the invention. However, it should be apparent to a person skilled in the art that many different alternative implementations could be used, for example entire functionality could be implemented in one processor or individual pieces could be implemented in hardware (e.g. ASIC).

Both the frame input process 240 and the frame output process 250 represent control processes implemented by the microprocessor 320 for controlling the jitter buffer and for controlling the receipt and output of frames. Although the processes cannot be considered to be truly independent as each receives input from the other and sends output to the other, the two processes can be considered to run independently as the frame input process is governed primarily by the receipt of packets from the IP network and therefore depends on the packet reception rate. However, the frame output process is primarily governed by requests for frames from the vocoder (and thus indirectly from the CODEC) and therefore depends on the constant output rate (which is dictated by the clock frequency of the crystal 165 associated with the CODEC).

Figure 4:
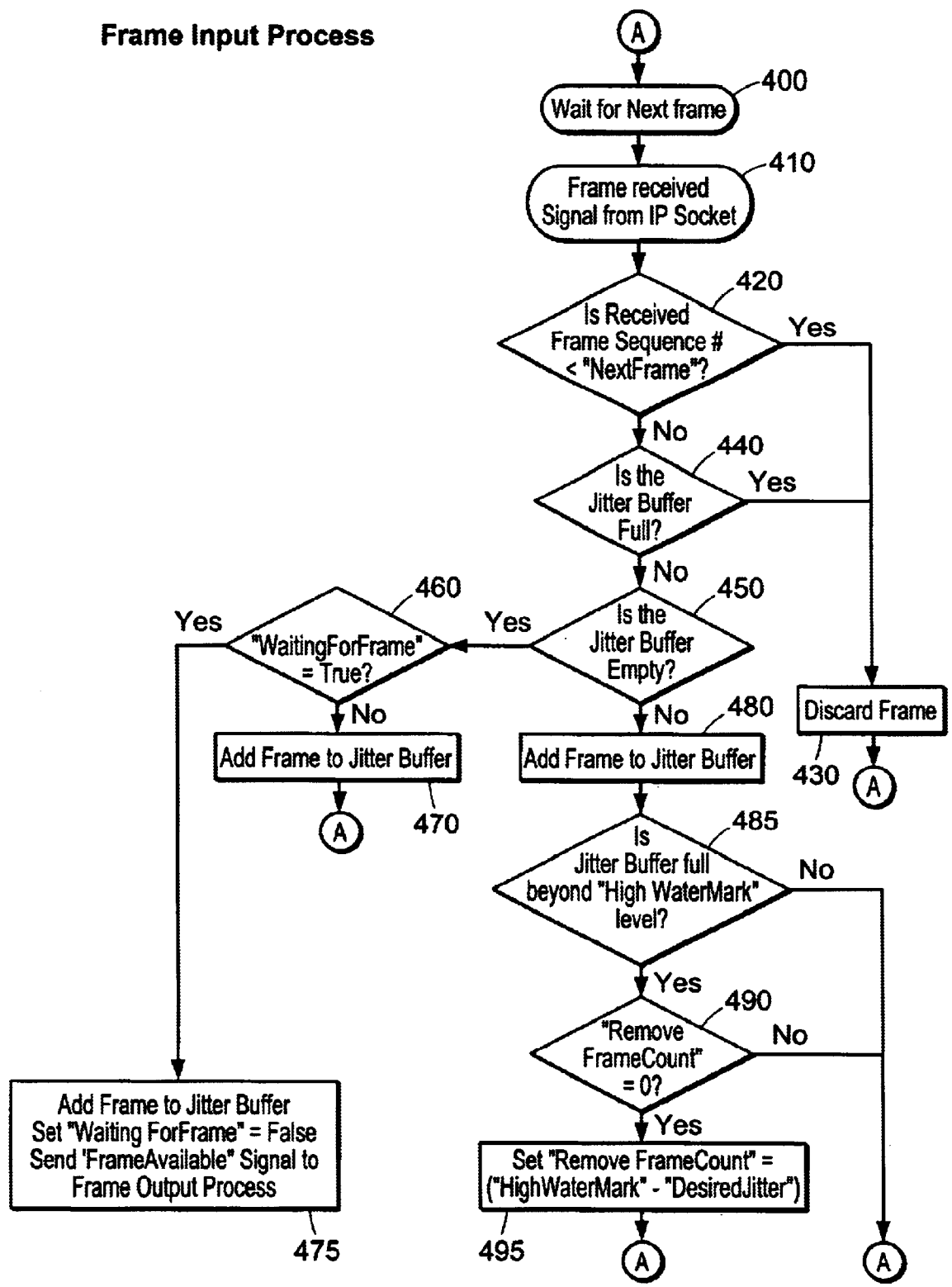
FIG. 4 is a flowchart of the Frame Input Process according to an embodiment of the invention.

A block diagram illustrating the frame input process 240 is shown in FIG. 4.

The frame input process runs at a variable rate dictated by the timing of received packets. Between frames, the process is effectively dormant and waits for the next frame 400 to be received from the IP network. The process wakes up when a frame received signal is received from the IP socket 410. The process determines whether the received sequence number is less than the expected sequence number of the next frame. If so, this implies that the frame is too late for sending to the vocoder and is therefore discarded 430, at which point the process returns to the wait-for-next-frame step 400. Note the frame is also discarded if the received frame is already in the jitter buffer. Assuming the frame is not too late, the process determines whether the jitter buffer is full 440. Note that the jitter buffer should not be full, especially if the two processes are operating correctly, and a full jitter buffer would indicate an unusual event has occurred, for example, a network error occurred resulting in a partial delay of several packets which are then all received simultaneously. However, a streaming service, for example, an internet radio broadcast, where there is no silence interval for a long time, can also fill the buffer. If the buffer is full, the frame is discarded. The processor then determines whether the jitter buffer is empty 450. If the jitter buffer is empty, the processor determines whether the system is waiting for a frame 460 (in this embodiment, by evaluating a waiting-for-frame variable which is set by the frame output process). If the answer to this inquiry is negative, the processor adds the frame to the jitter buffer 470 and returns to the wait-for-next-frame step 400. However, if the result of the waiting-for-frame inquiry is positive, the system not only adds the frame to the jitter buffer but sets the waiting for frame variable to false and also sends a frame available signal to the frame output process. The frame available signal causes the frame output process to expedite sending the frame to the vocoder. Note these signals need to be sent from the frame input process to the frame output process to trigger certain events, as the frame input process runs at a different rate than the frame output process.

Returning to step 450, if the jitter buffer is not empty (which would be the normal state during a call), the processor adds a frame to the jitter buffer 480. The processor then evaluates the condition of the buffer. In this example, the processor determines whether the jitter buffer is full beyond the high water mark level 485. If the answer is negative, the processor simply returns to the wait-for-next-frame step 400. However, if the jitter buffer is full beyond the high water mark level, the processor determines whether the RemoveFrameCount variable equals zero 490, and if not, it returns to the wait-for-next-frame step. However, if the RemoveFrameCount is equal to zero, the frame input process sets the RemoveFrameCount variable to a number representing the number of frames the system will need to delete from the buffer in order to reach the desired jitter level. In this embodiment, this value is determined to be the high water mark minus the desired jitter level as shown at 495 and then returns to the wait-for-next-frame step.

Figure 5:
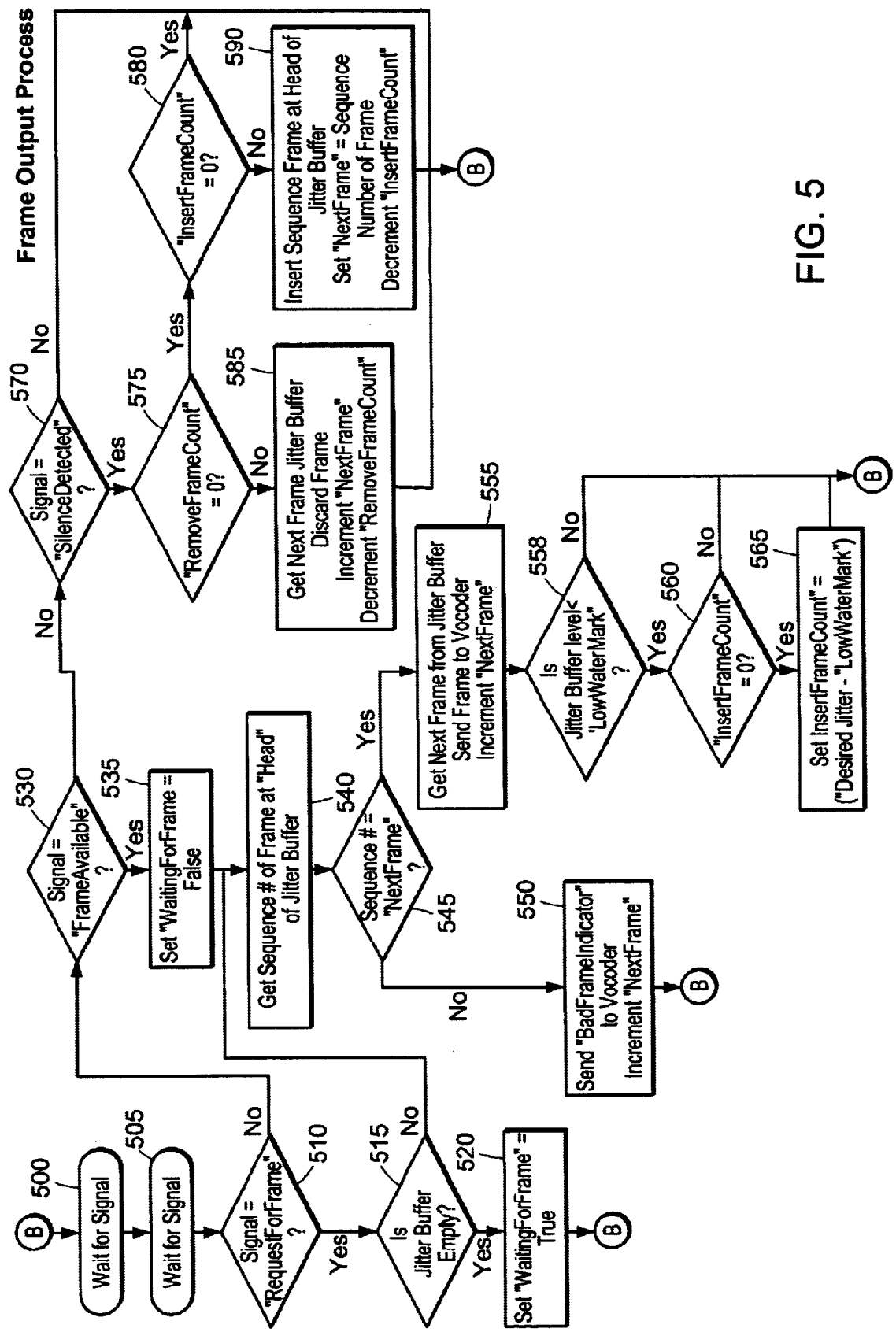
FIG. 5 is a flowchart of the Frame Output Process according to an embodiment of the invention.

FIG. 5 is a flowchart of the frame output process executed by the processor 320 according to an embodiment of the invention. In this embodiment, the process effectively lies dormant in a wait for signal state 500 until the processor receives a signal 505. In this embodiment, the processor evaluates the signal to determine which of three possible signals is received. Thus the processor evaluated the received signal to determine whether a received signal is a request for frame signal from the DSP 510; a frame available signal 530 from the frame input process; or a silence detected signal from the DSP 570.

In response to receiving a request for frame signal, the processor determines whether the jitter buffer is empty 515. If the jitter buffer is empty, the processor sets the waiting for frame variable to true 520 which is used to indicate to the frame input process that the DSP is waiting for a frame and returns to the wait for signal state. If the jitter buffer is not empty (which will be the normal state during a call) the processor determines the sequence number of the frame at the head of the jitter buffer 540. The processor then determines whether this frame is late by evaluating whether the sequence number is equal to the value of the next frame variable 545. The next frame variable indicates the expected sequence number of the next frame in the sequence of frames required by the vocoder. If the evaluation is negative (that is to; say the frame is late), the processor sends a bad frame indicator signal to the vocoder and increments the next frame variable 550 and then returns to the wait for signal state. If the sequence number is equal to the next frame value, the processor gets the next frame from the jitter buffer and sends the frame to the vocoder, and increments the next frame variable 555. The processor then checks the status of the jitter buffer to determine whether a condition that requires active management of the jitter buffer is true. In this embodiment, the process evaluates whether the jitter buffer is becoming depleted by determining whether the jitter buffer level is less than the low water mark value 558. If not, the system simply returns to the wait for signal step. However, if the jitter buffer level is less than the low water mark, the system evaluates whether the insert frame count variable is equal to zero 560. If it is, the processor sets the insert frame count variable to the number of frames which need to be inserted, which in this embodiment is equal to the desired jitter level minus the low water mark 565. Thus, steps 558, 560 and 565 are evaluating a condition to indicate the status of the buffer and the number of frames that need to be inserted in order to achieve the desired jitter level. However, frames are only inserted where appropriate based on the detection of frames that satisfy particular criteria. This will be described in reference to steps 570, 580 and 590 below.

The evaluation step 530 determines whether the received signal was a frame available signal from the frame input process (which will happen if there is an outstanding frame request from the DSP which has not yet been satisfied). If so, the processor sets the waiting for frame variable equal to false 535 and then proceeds to step 540 as described above.

The frame output process is also responsible for the insertion and deletion of; frames when required and when frames satisfying the appropriate criteria are detected. Thus, the third possible signal received by the frame output process and evaluated at step 570 is a signal from the voice activity detector indicating that a silence frame is detected. If a silence frame is detected, the processor determines whether it should either insert a frame or delete a frame based on the condition of the buffer. This is implemented by evaluating whether the RemoveFrameCount variable is equal to zero (which would indicate that zero frames need to be removed) 575. If the answer is negative, the processor gets the next frame from the jitter buffer and discards it on the assumption that the next frame will also be a silent frame. The processor also increments the next frame variable and decreases RemoveFrameCount variable 585 before returning to the wait-for-signal step.

If the RemoveFrameCount equals zero, the processor evaluates whether the insert frame count variable equals zero 580. A positive evaluation at this step indicates that the system does not need to insert or delete a frame and thus returns to the wait-for-signal step 500. However, if the insert frame count is not equal to zero, then the jitter buffer is becoming depleted and the system inserts an additional silence frame on the assumption that it is better to add a new silence after a silence frame than between two frames having actual speech content. Thus, the system proceeds to step 590 wherein: a silence frame is inserted at the head of the jitter buffer; the next frame variable is set to the sequence number of the inserted silence frame; and the processor decreases the insert frame count variable. The process then returns to the wait-for-signal step.

Thus, in this system, the jitter buffer manager, evaluates the condition of the buffer whenever a frame is received from the IP network or whenever a frame is requested by the vocoder. In this embodiment, there are two conditions, a high water mark which indicates that the jitter buffer is becoming full, and a low water mark which indicates that the jitter buffer is becoming depleted, as well as a desired jitter level. Indications are stored as to whether one of these conditions is satisfied. Meanwhile, the frame output process receives an indication from a detector whenever a frame satisfies a particular criteria. In this embodiment, the criteria is the receipt of a silence condition. If the jitter buffer level is greater than the high water mark and a silence condition is detected by the detector, the system discards the frame at the head of the jitter buffer. However, if the low water mark has been surpassed, the system inserts a silence frame after a silence frame is played out.

The values for the high water mark, desired jitter and low water mark may be hard-coded. Alternatively, these values may be dynamically updated by an optional Quality of Service (QoS) manager (not shown). For example, for systems which use a Real-time Transport Protocol (RTP) and a RTP control protocol (RTCP), the system preferably implements an adaptive jitter buffer that uses the RTCP protocol to keep track of RTP performance and updates these values dynamically in order to provide an optimal (minimal) jitter buffer delay while at the same time providing the desired QoS. In other words, the system monitors its performance (which may be dictated by the performance of the IP network which is transporting the packets) in order to adaptively alter the jitter buffer conditions in order to provide the best QoS as possible.

Note that the system as described operates on assumption that there will be a silence interval which is longer than a single frame. We will call this the silence assumption. Therefore, once high water mark is reached, the processor looks for a silence interval. Once a silence condition is detected, the processor deletes the next frame on the assumption that the next frame will also be silent. The silence assumption is reasonably accurate for two consecutive frames as there is a high probability that a silence interval will comprise more than one frame. However the probability that silence interval will continue diminishes with each successive frame. Thus the system preferably avoids deleting consecutive frames by waiting for the next silence interval to commence once it has deleted a frame (until RemoveFrameCount is decremented to zero). However, if the condition of the jitter buffer worsens, the system may have to delete more than one frame per silence interval.

Figure 6:
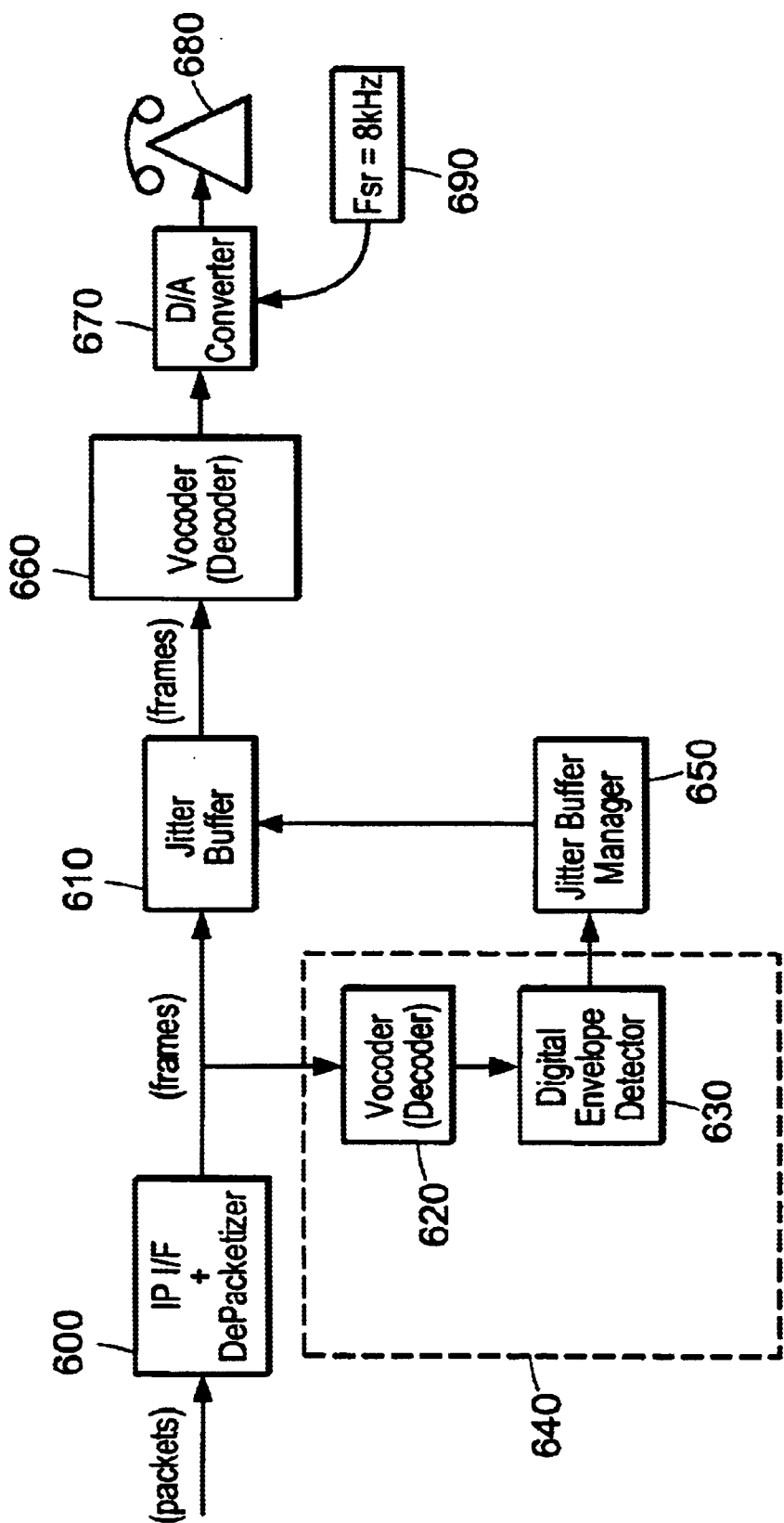
FIG. 6 is an alternative embodiment of the invention which implements a detector before the jitter buffer in order to provide more control of the frames in the jitter buffer.

FIG. 6 describes an alternative embodiment of the invention which implements a detector that evaluates frames before they are inserted into the jitter buffer in order to provide more control of the frames in the jitter buffer. Thus, a VoIP apparatus according to this embodiment would have a detector 640 coupled to the output of the IP interface and depacketizer 600. This detector will detect frames which satisfy a criteria as they are received. This will allow the jitter buffer manager 650 to use more intelligence in controlling the insertion and/or deletion of frames in the jitter buffer. The apparatus also includes a jitter buffer 610, a vocoder 660, a digital-to-analog converter 670, a sampling rate clock source 690 and a handset 680 (or alternatively, an interface circuit for coupling to an analog phone). In this embodiment, the detector 640 includes an additional vocoder 620 and an envelope detector 630 for detecting frames which represent silence as they are received. This will allow the jitter buffer manager 650 to more reliably know which frames in the buffer represent silence and can therefore insert or delete silence frames in a more flexible manner. For example, implementing the detector prior to playout from the buffer avoids having to operate under the above described silence assumption, as the system will know which frames are silent. Note that, as shown, two vocoders are included (actually the detector only requires the decoder stage of a vocoder). However, given sufficient processing, a single multi-tasking vocoder can be used. Alternatively, the jitter buffer can store the output of the vocoder in systems for which conserving memory is less important than conserving DSP resources. Note that in such a system the decoded frames preferably maintain their sequence numbers while in the jitter buffer for proper handling of late frames, i.e. the decoded frames remain intact as a frame.

Yet another embodiment can use a different form of detector 640 for detecting frames which satisfy a different criteria. For example, many digital transmission systems encapsulate frames and/or packets with additional bits that are used for error detection and/or error correction. In such a system, the detector can determine which frames have bit errors (or uncorrectable errors). The jitter buffer manager can use this information in order to delete frames with errors if frames need to be deleted and no silence frames are available. For example, the IP stack, in particular the UDP protocol, which is used to transport the audio data, includes a checksum field that can be used to detect errors. Additionally, packet loss protection (PLP) algorithms similar to radio based error detection schemes have been proposed for IP networks. Such packet loss protection algorithms can provide suitable criteria for selecting frames with errors to be deleted.

Note that data transmission systems which use error detection and/or error correction typically use these bits to evaluate when a frame with errors is received in order to request retransmission of the errored frame. However, for voice conversations or other time-sensitive streaming services, there is typically insufficient time to request the retransmission of a frame. Typically, these frames are still sent to the vocoder on the assumption that there is insufficient time to replace the frame and that there is sufficient information in the frame to warrant the playback of the frame rather than discarding the frame. However, if the high water mark has been reached such that the system will need to discard a frame, the jitter buffer manager preferably selects a frame which is received with errors to be discarded, rather than discarding a frame at random.

Numerous modifications, variations and adaptations may be made to the particular embodiments of the invention described above without departing from the scope of the invention, which is defined in the claims. For example, we have described a system having a single microprocessor for implementing both the-frame input process and the frame output process. As an alternative, each process can be implemented by a dedicated processor, or the DSP and Microprocessor functions can be implemented using a single processor, or some of the software blocks can be implemented in hardware blocks. Furthermore the digital envelope detector could be replaced with an analog detector (e.g. RC circuit) located after the CODEC.

Additionally, the criteria to delete a frame can include mode information,(e.g. transmit, receive or quiescent mode), associated with received frames. In an embodiment using such mode information, the voice activity detector is used by an echo controller (not shown) to determines when said apparatus is operating in transmit or quiescent mode and the criteria includes information associated with received frames about the mode of operation of the apparatus. Alternatively, the echo controller can use a separate detector and send mode information to the Buffer Manager.

Furthermore, we have described a system that adds or deletes entire frames. However as an alternative, the system could be configured to add or delete partial frames. For example, when the low water mark is reached, the system can add a period of silence shorter than a frame instead of adding a complete silence frame.

What is claimed is:

1. Apparatus comprising:

a data interface for receiving frames from a data network;

a jitter buffer for temporarily storing said frames;

a detector for detecting frames which satisfy a criteria; and a buffer manager for controlling the frames stored in said jitter buffer based on the condition of said buffer and on frames which satisfy said criteria;

wherein said detector is a silence detector and criteria represents a silence interval, and wherein said silence detector comprises an envelope detector.

2. Apparatus comprising:

a data interface for receiving frames from a data network;

a jitter buffer for temporarily storing said frames;

a detector for detecting frames which satisfy a criteria; and a buffer manager for controlling the frames stored in said jitter buffer based on the condition of said buffer and on frames which satisfy said criteria;

wherein said detector is a silence detector and criteria represents a silence interval and wherein said silence detector comprises a voice activity detector.

3. Apparatus comprising:

a data interface for receiving frames from a data network;

a jitter buffer for temporarily storing said frames;

a detector for detecting frames which satisfy a criteria; and a buffer manager for controlling the frames stored in said jitter buffer based on the condition of said buffer and on frames which satisfy said criteria;

wherein said apparatus includes an echo controller and wherein said detector determines the mode of operation of said apparatus and wherein said criteria includes information associated with received frames about the mode of operation of the apparatus.

4. Apparatus comprising:

data interface for receiving frames from a data network;

jitter buffer memory for temporarily storing said frames;

a detector for detecting frames which satisfy a criteria indicative of the impact of the insertion or deletion of a frame; and a buffer manager for controlling the input of received frames into said jitter buffer and the output of frames from said jitter buffer, said buffer manager capable of determining a buffer condition which requires either the insertion or deletion of a frame from said jitter buffer, and inserting or deleting frames in said buffer which satisfy said criteria depending upon said buffer condition;

wherein said detector is a silence detector and said criteria represents a silence interval.

5. Apparatus as claimed in claim 4 wherein said silence detector comprises an envelope detector.

6. Apparatus as claimed in claim 4 wherein said silence detector comprises a voice activity detector.

7. Apparatus comprising:

data interface for receiving frames from a data network;

jitter buffer for temporarily storing said frames;

a detector for detecting frames which satisfy a criteria indicative of the impact of the insertion or deletion of a frame; and a buffer manager for controlling the input of received frames into said jitter buffer and the output of frames from said jitter buffer, said buffer manager capable of determining a buffer condition which requires either the insertion or deletion of a frame from said jitter buffer, and inserting or deleting frames in said buffer which satisfy said criteria depending on said buffer condition;

wherein said apparatus includes an echo controller and wherein said detector determines the mode of operation of said apparatus and wherein said criteria includes information associated with received frames about the mode of operation of the system.

8. Apparatus comprising:

a data interface for receiving frames from a data network;

a jitter buffer for temporarily storing said frames;

a detector for detecting frames which satisfy a criteria indicative of the impact of the insertion or deletion of a frame; and a buffer manager for controlling the input of received frames into said jitter buffer and the output of frames from said jitter buffer, said buffer manager capable of determining a buffer condition which requires either of the insertion of or deletion of a frame from said jitter buffer, and inserting or deleting frames in said buffer which satisfy said criteria depending on said buffer condition;

wherein said detector comprises a bit error detector and said criteria comprises a frame received with errors.

9. Apparatus comprising:

a data interface for receiving frames from a data network;

a jitter buffer for temporarily storing said frames;

a detector for detecting frames which satisfy a criteria indicative of the impact of the insertion or deletion of a frame; and a buffer manager for controlling the input of received frames into said jitter buffer and the output of frames from said jitter buffer, said buffer manager capable of determining a buffer condition which requires either of the insertion of or deletion of a frame from said jitter buffer, and inserting or deleting frames in said buffer which satisfy said criteria depending on said buffer condition;

wherein said buffer manager includes separate Frame Input and Frame Output process which operate at different rates.

10. Apparatus comprising:

a data interface for receiving frames from a data network;

a jitter buffer for temporarily storing said frames;

a detector for detecting frames which satisfy a criteria indicative of the impact of the insertion or deletion of a frame; and a buffer manager for controlling the input of received frames into said jitter buffer and the output of frames from said jitter buffer, said buffer manager capable of determining a buffer condition which requires either of the insertion of or deletion of a frame from said jitter buffer, and inserting or deleting frames in said buffer which satisfy said criteria depending on said buffer condition;

wherein said detector detects said criteria after playout and said buffer manager deletes or inserts a single frame per silence interval at the head of said jitter buffer.

11. Apparatus comprising:

a data interface for receiving frames from a data network;

a jitter buffer for temporarily storing said frames;

a detector for detecting frames which satisfy a criteria indicative of the impact of the insertion or deletion of a frame; and a buffer manager for controlling the input of received frames into said jitter buffer and the output of frames from said jitter buffer, said buffer manager capable of determining a buffer condition which requires either of the insertion of or deletion of a frame from said jitter buffer, and inserting or deleting frames in said buffer which satisfy said criteria depending on said buffer condition;

wherein said detector detects said criteria prior to playout and said buffer manager deletes or inserts frames based on frame content.

12. Apparatus comprising:

a data interface for receiving frames from a data network;

a jitter buffer for temporarily storing said frames;

a detector for detecting frames which satisfy a criteria indicative of the impact of the insertion or deletion of a frame; and a buffer manager for controlling the input of received frames into said jitter buffer and the output of frames from said jitter buffer, said buffer manager capable of determining a buffer condition which requires either of the insertion of or deletion of a frame from said jitter buffer, and inserting or deleting frames in said buffer which satisfy said criteria depending on said buffer condition;

wherein said detector detects said criteria prior to playout and said buffer manager deletes frames which satisfy the condition prior to playout.

13. Apparatus comprising:

a data interface for receiving frames from a data network;

a jitter buffer for temporarily storing said frames;

a detector for detecting frames which satisfy a criteria indicative of the impact of the insertion or deletion of a frame; and a buffer manager for controlling the input of received frames into said jitter buffer and the output of frames from said jitter buffer, said buffer manager capable of determining a buffer condition which requires either of the insertion of or deletion of a frame from said jitter buffer, and inserting or deleting frames in said buffer which satisfy said criteria depending on said buffer condition;

wherein said condition comprises a high water mark and a low water mark and wherein said buffer manager deletes a frame from the head of said jitter buffer when the high water mark is exceeded and when the criteria is satisfied and inserts a frame at the head of said jitter buffer when the buffer is depleted below the low water mark and when said criteria is satisfied.

14. A method of managing a jitter buffer comprising the steps of:

receiving frames from a data network;

storing received frames into said jitter buffer;

detecting frames which satisfy a criteria; and controlling the frames stored in said jitter buffer based on the condition of said buffer and on frames which satisfy said criteria;

wherein said condition comprises a high water mark and a low water mark and wherein said controlling step comprises:

deleting a frame from said jitter buffer when the high water mark is exceeded and when said criteria is satisfied; and inserting a frame into said jitter buffer when said buffer is depeleted below said low water mark and said criteria is satisfied.

15. Apparatus comprising:

jitter buffer;

data interface for receiving frames from a data network and inserting said frames into said jitter buffer;

a detector for indicating a frame which represents a silence interval;

a buffer manager for determining a buffer condition, and, responsive to said condition being satisfied, controlling the insertion and deletion of frames in said buffer responsive to the detection of a silence interval.

16. Apparatus as claimed in claim 15 wherein said data interface comprises a depacketizer for deconstructing frames from a packet based data network.

17. Apparatus as claimed in claim 15 wherein said buffer manager inserts received frames into buffer in the correct order according to their sequence number.

18. Apparatus as claimed in claim 15 wherein said buffer manager outputs frames at a constant rate determined by a local clock source which can be in digital phone or in integrated phone or in interface to an analog/digital phone.

19. A method of managing a jitter buffer comprising the steps of:

receiving frames from a data network;

storing received frames into said jitter buffer;

detecting frames which satisfy a criteria using envelope detection means; and controlling the frames stored in said jitter buffer based on the condition of said buffer and on frames which satisfy said criteria;

wherein said criteria represents a silence interval.

20. A method of managing a jitter buffer comprising the steps of:

receiving frames from a data network;

storing received frames into said jitter buffer;

detecting frames which satisfy a criteria including detecting voice activity; and controlling the frames stored in said jitter buffer based on the condition of said buffer and on frames which satisfy said criteria;

wherein said criteria represents a silence interval.

* * * * *